United States Patent
Srikant et al.

(10) Patent No.: US 7,039,269 B2
(45) Date of Patent: May 2, 2006

(54) OPTICAL TRANSMISSION LINE AND OPTICAL TRANSMISSION SYSTEM UTILIZING SAME

(75) Inventors: V. Srikant, Evanston, IL (US); Sergey Y. Ten, Horseheads, NY (US); Jan Conradi, Corning, NY (US)

(73) Assignee: Corning Incorporated, Corning, NY (US)

( * ) Notice: Subject to any disclaimer, the term of this patent is extended or adjusted under 35 U.S.C. 154(b) by 81 days.

(21) Appl. No.: 10/113,448

(22) Filed: Mar. 28, 2002

(65) Prior Publication Data

US 2003/0039435 A1 Feb. 27, 2003

Related U.S. Application Data

(60) Provisional application No. 60/280,200, filed on Mar. 30, 2001.

(51) Int. Cl.
*G02B 6/28* (2006.01)

(52) U.S. Cl. .................. 385/24; 385/123; 359/337.5

(58) Field of Classification Search ........ 385/122–127, 385/24; 359/173, 337.5
See application file for complete search history.

(56) References Cited

U.S. PATENT DOCUMENTS

| | | | |
|---|---|---|---|
| 4,189,233 A * | 2/1980 | Hurt et al. ............. | 356/4.02 |
| 4,784,453 A * | 11/1988 | Shaw et al. ............ | 385/24 |
| 5,177,488 A * | 1/1993 | Wang et al. ........... | 342/167 |
| 5,778,128 A | 7/1998 | Wildeman .............. | 385/123 |
| 5,835,655 A | 11/1998 | Liu et al. ............... | 385/124 |
| 5,936,395 A * | 8/1999 | Kevorkian et al. ..... | 324/96 |
| 6,263,138 B1 | 7/2001 | Sillard et al. .......... | 385/123 |
| 6,366,728 B1 * | 4/2002 | Way et al. .............. | 385/123 |
| 6,404,964 B1 * | 6/2002 | Bhagavatula et al. .. | 385/123 |
| 6,430,347 B1 * | 8/2002 | Cain et al. ............. | 385/123 |
| 6,453,102 B1 * | 9/2002 | Dong et al. ............ | 385/123 |
| 6,470,126 B1 | 10/2002 | Mukusa ................. | 385/123 |
| 6,510,268 B1 | 1/2003 | De Montmorillon et al. ..................... | 385/123 |
| 6,546,178 B1 * | 4/2003 | Jiang et al. ............ | 385/127 |
| 6,584,262 B1 * | 6/2003 | Pilipetskii et al. ..... | 385/123 |

(Continued)

FOREIGN PATENT DOCUMENTS

WO WO 00/19255 8/1999

(Continued)

*Primary Examiner*—Ellen E. Kim
(74) *Attorney, Agent, or Firm*—Robert L. Carlson

(57) ABSTRACT

An optical signal transmission line includes a first fiber adapted to guide an optical signal therethrough and having a first κ, a second fiber adapted to guide the optical signal therethrough and having a second κ of less than or equal to about 100 nm at a wavelength of 1550 nm, and a κ compensating fiber adapted to guide the optical signal therethrough and having a third κ of greater than or equal to about 60 nm at a wavelength of 1550 nm. The first fiber, the second fiber and the κ compensating fiber are in optical communication, thereby defining an optical transmission line having a total dispersion and a total dispersion slope. The first κ, the second κ and the third κ cooperate such that the total dispersion is within the range of about 1.0 ps/nm-km $\geq$ total dispersion $\geq$ about −1.0 ps/nm-km at a wavelength of 1550 nm, and the total dispersion slope is within the range of about 0.02 ps/nm$^2$-km $\geq$ total dispersion slope $\geq$ about −0.02 ps/nm$^2$-km at a wavelength of 1550 nm.

23 Claims, 3 Drawing Sheets

U.S. PATENT DOCUMENTS

| | | |
|---|---|---|
| 6,731,848 B1 * | 5/2004 | Jiang et al. .................. 385/127 |
| 6,751,390 B1 * | 6/2004 | Qi et al. .................... 385/127 |
| 2002/0012510 A1 * | 1/2002 | Jiang et al. ................. 385/123 |
| 2002/0054743 A1 * | 5/2002 | Montmorillon et al. ..... 385/124 |
| 2002/0102084 A1 * | 8/2002 | Srikant ....................... 385/124 |
| 2002/0186946 A1 * | 12/2002 | Dong et al. ................. 385/127 |
| 2003/0053780 A1 * | 3/2003 | Zhang ........................ 385/127 |
| 2003/0118307 A1 | 6/2003 | Gruner-Nielsen et al. .. 385/127 |
| 2004/0101241 A1 * | 5/2004 | Kohnke et al. ............... 385/37 |
| 2004/0109655 A1 * | 6/2004 | Dennis et al. .............. 385/123 |

FOREIGN PATENT DOCUMENTS

| | | |
|---|---|---|
| WO | WO 01/71391 | 3/2001 |

* cited by examiner

OPTICAL TRANSMISSION LINE AND OPTICAL TRANSMISSION SYSTEM UTILIZING SAME

CROSS-REFERENCE TO RELATED APPLICATIONS

This application claims the benefit of priority under 35 U.S.C. §119(e) of U.S. Provisional Application Ser. No. 60/280,200 filed on Mar. 30, 2001.

BACKGROUND OF THE INVENTION

1. Field of the Invention

The invention is directed to dispersion compensating fibers for use in telecommunication systems, and more particularly, to optical fibers for compensating the dispersion and dispersion slope of non-zero dispersion shifted fibers.

2. Technical Background

The increased demand for higher bit transmission rates has resulted in a large demand for optical transmission systems that can control dispersion effects. A linear analysis of common optical transmission systems indicates that while transmission systems can tolerate about 1,000 ps/nm residual dispersion at 10 Gbit/second, these systems tolerate only about 62 ps/nm residual dispersion at 40 Gbit/second. Therefore, it is apparent that it is important to accurately control the dispersion within high bit-rate transmission systems, and that this control becomes increasingly important as the transfer rate increases. Further, the need to accurately control dispersion means that dispersion slope of a transmission fiber must also be compensated as transfer rates approach 40 Gbit/second.

Various solutions have been proposed to achieve the low dispersion and dispersion slope values required for compensating non-zero dispersion shifted fibers, including: photonic crystal fibers, higher order dispersion compensation, dispersion compensating gratings and dual fiber dispersion compensating techniques. Each of these solutions has significant drawbacks associated therewith.

Photonic crystal fibers are designed to have a large negative dispersion and a negative dispersion slope that are close to those required for compensating non-zero dispersion shifted fibers. However, photonic crystal fibers have significant drawbacks including a relatively small effective area of about 10 $\mu m^2$ or less that leads to unacceptably high splice losses and hence require the use of a transition fiber to reduce splice losses. In addition, due to the very nature of photonic crystal fibers, i.e. glass/air interfaces in the core of the fiber, the related attenuation is unacceptable in the transmission window of interest due to the residual absorption of the 1380 nm water peak. Further, photonic crystal fibers are significantly difficult and expensive to manufacture on a large scale.

Higher order dispersion compensation relies on the dispersion properties of higher order modes in multi-mode fiber. It has been demonstrated that higher order modes, e.g. LP02 and LP11, have higher negative dispersions and dispersion slopes than fundamental modes. Higher order dispersion compensation typically relies on the conversion of a transmitted fundamental mode to one of the higher order modes via a mode converter. Subsequently, this higher order mode is propagated in a fiber that supports that mode in addition to the fundamental mode. After a finite distance, the higher order mode is coupled back to the fundamental mode via a second mode converting device. Problems associated with higher ordered dispersion compensation solutions include inefficient mode converters and the difficulty of producing intermediate fibers that allow higher order mode transmission while resisting coupling to the fundamental mode.

Dispersion compensating gratings are utilized to achieve a required differential group delay via chirped gratings. Techniques utilizing dispersion compensating gratings have been shown to be useful only for narrow bands, as these techniques typically suffer from dispersion and dispersion slope ripple when the required grating length becomes large.

Dual fiber dispersion compensating solutions for non-zero dispersion shifted fibers are similar to the dispersion compensating gratings techniques described above in that the dispersion compensation and the slope compensation are de-coupled and solved for separately. Typically, dual fiber dispersion compensating techniques include the use of a dispersion compensating fiber followed by a dispersion slope compensating fiber. Such solutions require the use of a dispersion slope compensating fiber that compensates for a relatively small dispersion slope. Extensive profile modeling of optical fibers has resulted in well-established correlations between dispersion slope, effective area and bend sensitivity. By increasing the role played by waveguide dispersion in a given fiber, it is possible to decrease the slope and even create a negative slope in some cases. However, as the effective area is decreased, the bend sensitivity of the fiber is increased. Effective area of the fiber can be increased at the expense of further degradation of the bend sensitivity. Decreasing the dispersion slope, or making the dispersion slope negative, results in working very close to the cut-off wavelength of the fundamental mode, which in turn makes the fiber more bend sensitive and results in greater signal loss at long wavelengths, i.e., wavelengths greater than 1560 nm. As a result of these relationships, it is extremely difficult to manufacture a viable slope compensating fiber for the two fiber dispersion and dispersion slope compensating solutions.

Heretofore, the most viable broad band commercial technology available to reduce or eliminate dispersion has been dispersion compensating fiber modules. As dense wavelength division multiplexing deployments increase to 16, 32, 40 and more channels, broadband dispersion compensating products are desired. Telecommunication systems presently include single-mode optical fibers which are designed to enable transmission of signals at wavelengths around 1550 nm in order to utilize the effective and reliable erbium-doped fiber amplifiers currently available. One such fiber is LEAF® optical fiber, manufactured by and available from Corning, Inc. of Corning, N.Y. LEAF® fiber is a positive non-zero dispersion shifted fiber that has become the optical fiber of choice for many new systems due to its inherently low dispersion and economic advantage over conventional single mode fibers.

With continuing interest in higher bit-rate information transfer, i.e. greater than 40 Gbit/second, ultra-long reach systems, i.e., systems greater than 100 km in length, and optical networking, it has become imperative to use dispersion compensating fibers in networks that carry data on non-zero dispersion shifted fibers. The combination of the early versions of dispersion compensating fibers with non-zero dispersion shifted fibers effectively compensated dispersion at only one wavelength. However, higher bit-rates, longer reaches and wider bandwidths require dispersion slope to be compensated more exactly. Consequently, it is desirable for the dispersion compensating fiber to have dispersion characteristics such that its dispersion and dispersion slope are matched to that of the transmission fiber it is required to compensate. The dispersion and dispersion slope matching characteristic described above is also indicative of multiple dispersion compensating fiber systems.

It would therefore be desirable to develop an alternative dispersion compensating apparatus having the ability to compensate for dispersion of non-zero dispersion shifted fibers and other positive dispersion optical fibers over a wide wavelength band around 1550 nm.

SUMMARY OF THE INVENTION

The present invention relates to an apparatus that compensates for dispersion and dispersion slope of a non-zero dispersion shifted fiber. The methods and apparatus disclosed herein enable accurate and complete compensating for dispersion and dispersion slope in a non-zero dispersion shifted fiber.

One aspect of the present invention relates to an optical signal transmission line that includes a first fiber adapted to guide an optical signal therethrough and having a first kappa (κ), i.e., the ratio of dispersion to dispersion slope, at a wavelength of 1550 nm, a second fiber adapted to guide the optical signal therethrough and having a second κ of less than or equal to about 100 nm at a wavelength of 1550 nm, and a κ compensating fiber adapted to guide the optical signal therethrough and having a third κ which is meant to match the total dispersion and dispersion slope of the first fiber to that of the second fiber. Preferably, the κ of the second compensating fiber is greater than or equal to about 60 nm at a wavelength of 1550 nm. The first fiber, the second fiber and the κ compensating fiber are in optical communication thereby defining the optical transmission line having a total dispersion and a total dispersion slope within a wavelength band of between about 1450 nm and 1600 nm. The first κ, the second κ, and the third κ preferably cooperate such that the total dispersion of the transmission link is within the range of about 2.0 ps/nm-km ≧ total dispersion ≧ about –2.0 ps/nm-km at a wavelength of 1550 nm, and the total dispersion slope is within the range of about 0.02 ps/nm²-km ≧ total dispersion slope ≧ –0.02 ps/nm²-km at a wavelength of 1550 nm.

Another aspect of the present invention relates to a dispersion compensating module for compensating dispersion and dispersion slope of a transmission fiber adapted to guide an optical signal therethrough and having a κ value, the module including a first compensating fiber adapted to guide the optical signal therethrough and having a κ of less than or equal to about 100 nm at a wavelength of 1550 nm, and a second compensating fiber adapted to guide the optical signal therethrough and having a κ which is meant to match the total dispersion and dispersion slope of the first fiber to that of the second fiber. Preferably, the κ of the second compensating fiber is greater than or equal to about 60 nm at a wavelength of 1550 nm. The first and second compensating fibers are in optical communication with the transmission fiber, thereby defining an optical transmission line having a total dispersion and a total dispersion slope. The κ of the first compensating fiber and the κ of the second compensating fiber preferably cooperate with the κ of the transmission fiber such that the total dispersion of the optical transmission line is within the range of about 2.0 ps/nm-km ≧ total dispersion ≧ about –2.0 ps/nm-km at a wavelength of 1550 nm, and the total dispersion slope of the optical transmission line is within the range of about 0.02 ps/nm²-km ≧ total dispersion slope ≧ about –0.02 ps/nm²-km at a wavelength of 1550 nm.

The present invention also includes optical communication systems employing dispersion compensating fibers and modules in accordance with the embodiments described above.

The present invention utilizes readily available waveguide optical fibers to accurately and completely compensate for both dispersion and dispersion slope, thereby eliminating the need for high cost compensating materials and components and/or the required use of compensating fibers that are difficult and expensive to manufacture and which contribute to significant signal loss.

Additional features and advantages of the invention will be set forth in the detailed description which follows and will be apparent to those skilled in the art from the description or recognized by practicing the invention as described in the description which follows, together with the claims and appended drawings.

It is to be understood that the foregoing description is exemplary of the invention only and is intended to provide an overview for the understanding the nature and character of the invention as it is defined in the claims. The accompanying drawings are included to provide a further understanding of the invention and are incorporated and constitute part of this specification. The drawings illustrate various features and embodiments of the invention, which, together with their description serve to explain the principles and operation of the invention.

DETAILED DESCRIPTION OF THE PREFERRED EMBODIMENT

Figure 1:
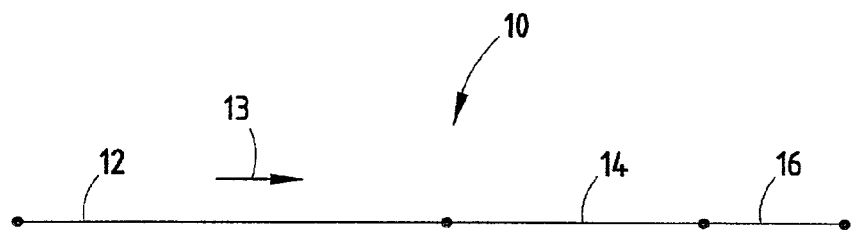
FIG. 1 is a schematic view of an optical signal transmission line embodying the present invention.

For purposes of the description herein, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Definitions

The following definitions and terminology are commonly used in the art.

The relationship between a transmission fiber and a dispersion compensating fiber that completely compensates for the dispersion of the transmission fiber follows the general equation of:

$$D_{DC}(\lambda_C)L_{DC} = -D_T(\lambda_C)L_T, \quad (1)$$

wherein $D_{DC}(\lambda_C)$ is the dispersion of the dispersion compensating fiber, $L_{DC}$ is the length of the dispersion compensating fiber, $D_T(\lambda_C)$ is the dispersion of the transmission fiber, $\lambda_C$ is the center wavelength of the optical transmission band, and $L_T$ is the length of the transmission fiber. This desired relationship of dispersion between the dispersion compensating fiber and the transmission fiber holds true for dispersion compensating fibers constructed of multiple compensation fibers.

The desired relationship of the κ of the optical fibers in a transmission line is as follows:

$$\kappa_{DC}(\lambda_C) = \frac{D_{DC}}{S_{DC}} = \kappa_T(\lambda_T) = \frac{D_T}{S_T}, \quad (2)$$

wherein $\kappa_{DC}(\lambda_C)$ is the κ value for the dispersion compensating fiber, $D_{DC}$ is the dispersion for the dispersion compensating fiber, $S_{DC}$ is the dispersion slope for the dispersion compensating fiber, $\kappa_T(\lambda_T)$ is the κ value for the transmission fiber, $D_T$ is the dispersion for the transmission fiber, and $S_T$ is the dispersion slope for the transmission fiber. The relationship between κ, dispersion and dispersion slope is also desired when two or more compensating fibers are employed.

The desired relation between the κ values, the dispersion values and the dispersion slope values in a two-fiber compensating scheme, are defined by the equations:

$$\frac{\kappa_{SC}}{\kappa_T} = \frac{1 + X/\kappa_T}{1 + Y} \quad (3)$$

$$X = \frac{L_{FC}D_{FC}}{L_T S_T} \quad (4)$$

$$Y = \frac{L_{FC}S_{FC}}{L_T S_T}, \quad (5)$$

wherein $\kappa_{SC}$ is the κ value for the dispersion compensating fiber, $\kappa_T$ is the κ value for the transmission fiber, $L_{FC}$ is the length of the kappa compensating fiber, $D_{FC}$ is the dispersion of the kappa compensating fiber, $L_T$ is the length of the transmission fiber and $S_T$ is the dispersion slope of the transmission fiber.

Referring initially to FIG. 1, there is shown an embodiment of an optical signal transmission line 10 in accordance with the present invention. Optical signal transmission line 10 includes a transmission fiber 12 adapted to guide an optical signal therethrough in a direction indicated by an arrow 13 and having a first κ value. Optical signal transmission line 10 also includes a first kappa compensating fiber 14 adapted to guide optical signal 13 therethrough and having a second κ of less than or equal to about 100 nm at a wavelength of 1550 nm. Transmission line 10 further includes a dispersion compensating fiber 16 adapted to guide optical signal 13 therethrough and having a third κ of greater than or equal to about 60 nm at a wavelength of 1550 nm. Transmission fiber 12, kappa compensating fiber 14 and dispersion compensating fiber 16 are in optical communication with one another, thereby defining optical signal transmission line 10 having a total dispersion and total dispersion slope. In operation, the κ of transmission fiber 12, the κ of kappa compensating fiber 14 and the κ of dispersion compensating fiber 16 cooperate such that the total dispersion of transmission line 10 is within the range of about 2.0 ps/nm-km ≧ total dispersion ≧ about −2.0 ps/nm-km at 1550, and more preferably over a range of wavelengths surrounding 1550 nm, for example over the wavelength range between 1530 and 1620 nm, and the total dispersion slope of transmission line 10 is within the range of about 0.02 ps/nm²-km ≧ total dispersion slope ≧ −0.02 ps/nm²-km at 1550 nm.

As discussed above, two-fiber dispersion compensating solutions as proposed in the past were based on joining a first dispersion compensating fiber to a second dispersion slope compensating fiber. However, these solutions typically require that the second dispersion fiber have a relatively low κ value, e.g. κ values of less than 50 nm. Manufacturing certain optical fibers having κ values of less than 100 nm becomes progressively more difficult as the κ value is decreased.

The present solution utilizes compensating fibers which compensate for κ in at least two sequential steps. Referring to equations 3–5 above, kappa compensating fiber 14 at least partially compensates for the κ value of transmission fiber 12, thereby allowing the remaining dispersion and κ to be compensated by another compensating fiber that is easier to manufacture. This implies that the κ value for dispersion compensating fiber 16 must be greater than the κ value for transmission fiber 12 in equation 3. As a result, variables X and Y must satisfy certain conditions which in turn means that the dispersion and the dispersion slope of kappa compensating fiber 14 must also satisfy certain conditions. Table 1 shows four scenarios for compensating a transmission fiber having positive dispersion and positive slope at 1550 nm: kappa compensating fiber 14 having a positive dispersion and a positive dispersion slope; kappa compensating fiber 14 having a negative dispersion and a negative dispersion slope; kappa compensating fiber 14 having a positive dispersion and a negative dispersion slope; and, kappa compensating fiber 14 having a negative dispersion and a positive dispersion slope. Table 1 below illustrates desired relationships of the kappa of the kappa compensating fiber to the kappa of the transmission fiber, when each of these four cases of kappa compensating fiber are used with various combinations of transmission and slope compensating fiber (in particular, the first case where the kappa of the slope compensating fiber is greater than that of the transmission fiber, and the second case where the kappa of the transmission fiber is greater than that of the slope compensating fiber). $\kappa_{SC}$ is the κ value for the dispersion compensating fiber 16, $\kappa_T$ is the κ value for transmission fiber 12, and $\kappa_{FC}$ is the κ value for kappa compensating fiber 14.

|  | Case I +D/+S | Case II −D/−S | Case III −D/+S | Case IV +D/−S |
|---|---|---|---|---|
| $K_{SC} > K_T$ | $K_{FC} > K_T$ | $K_{FC} < K_T$ | Never | Always |
| $K_{SC} < K_T$ | $K_{FC} < K_T$ | $K_{FC} > K_T$ | Always | Never |

Table 1 indicates that if kappa compensating fiber 14 has the characteristics listed in Case III, there is no advantage of having kappa compensating fiber 14 included within transmission line 10. Similarly, a fiber fitting Case II may be eliminated as solving for $\kappa_{SC}$ greater than $\kappa_T$ will lead to a single fiber dispersion and dispersion slope compensation. As noted above, manufacturing optical fibers adapted to fully compensate for both dispersion and dispersion slope is often difficult if not impossible. It should be noted when evaluating the fibers of Case I and Case IV that the best κ compensation fiber should have as large a negative dispersion slope and as large a positive dispersion value as can be achieved. This implies that κ compensating fibers fitting Case IV are better than κ compensating fibers fitting Case I. However, it is known in the art that to achieve low positive slopes and large negative slopes, waveguide dispersion must be utilized which in turn results in a dispersion value that is less than that of a single mode fiber. Therefore, kappa compensating fiber 14 should preferably satisfy Case I requirements as described above and have both a positive dispersion and positive dispersion slope.

EXAMPLE

Figure 2:
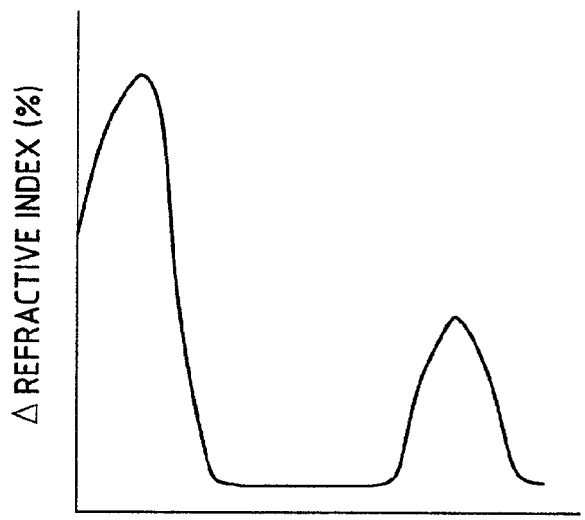
FIG. 2 is a diagram of a refractive index profile for a LEAF® optical waveguide fiber.

Referring to FIG. 1, one suitable fiber 12 for use in optical signal transmission line 10 is a large effective area waveguide optical fiber, such as those that are disclosed by U.S. Pat. No. 5,835,655, entitled Large Effective Area Waveguide Fiber, which is incorporated herein by reference in its entirety, and U.S. patent application Ser. No. 09/373,944, entitled Positive Dispersion Low Dispersion Slope Fiber, filed Aug. 13, 1999, which claims priority from U.S. Provisional Pat. App. Ser. No. 60/099,979, filed Sep. 11, 1998, and which are both incorporated herein by reference in their entirety. A refractive index profile of a suitable large effective area is illustrated in FIG. 2. A preferred fiber is LEAF® waveguide optical fiber, manufactured by Corning Incorporated of Corning, N.Y. Several of the optical characteristics and properties of the LEAF® fiber are listed below in Table 2.

TABLE 2

OPTICAL PROPERTIES FOR CORNING LEAF ® FIBER

| | |
|---|---|
| Dispersion of 1550 nm | 4 ps/nm-km |
| Dispersion Slope of 1550 nm | 0.08 ps/nm²-km |
| κ at 1550 nm | 50 nm |
| Zero Dispersion Wavelength | 1489 nm–1507 nm |
| Mode Field Diameter | 9.2 µm–10.0 µm |

Preferably, the transmission fiber 12 has the following properties at 1550 nm: positive dispersion, preferably between about 2 ps/nm-km and about 8 ps/nm-km; a dispersion slope of less than 0.15 ps/nm²-km, more preferably of less than 0.10 ps/nm²-km; and, an effective area of greater than 60 µm² more preferably of greater than 65 µm², and most preferably of greater than 70 µm². LEAF® fiber has a large effective area of about 72 µm², which offers higher power handling capability, higher optical signal to noise ratio, longer amplifier spacing, and maximum dense wavelength division multiplexing channel plan flexibility. The large effective area of LEAF® fiber also provides the ability to uniformly reduce non-linear affects. The dispersion compensating fibers disclosed herein are exceptional in their ability to compensate for the dispersion of non-zero dispersion shifted fibers, and in particular, LEAF® fiber.

In the present example, kappa compensating fiber 14 is SMF-28™ fiber, which is manufactured by and available from Corning Incorporated of Corning, N.Y. Several of the optical characteristics and properties of the SMF-28™ fiber are listed below in Table 3.

TABLE 3

OPTICAL PROPERTIES FOR CORNING SMF-28 ™ FIBER

| | |
|---|---|
| Dispersion at 1550 nm | 17 ps/nm-km |
| Dispersion Slope at 1550 nm | 0.056 ps/nm²-km |
| κ at 1550 nm | 303.57 nm |
| Zero Dispersion Wavelength | 1301.5 nm–1321.5 nm |
| Mode Field Diameter | 9.6 µm–12.2 µm |

Figure 3:
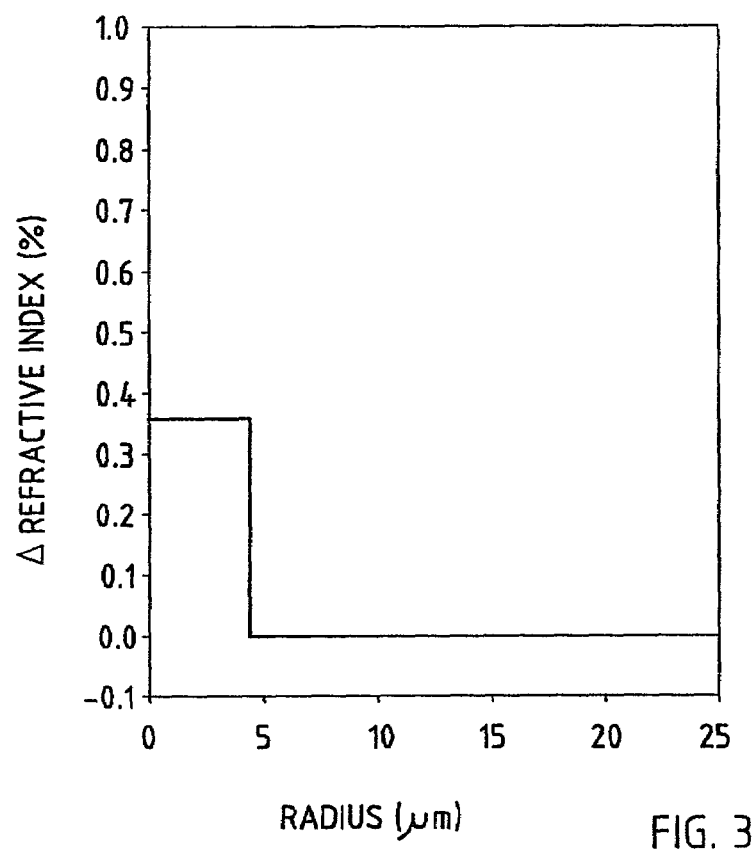
FIG. 3 is a diagram of a refractive index profile for an SMF-28™ optical waveguide fiber.
Figure 4:
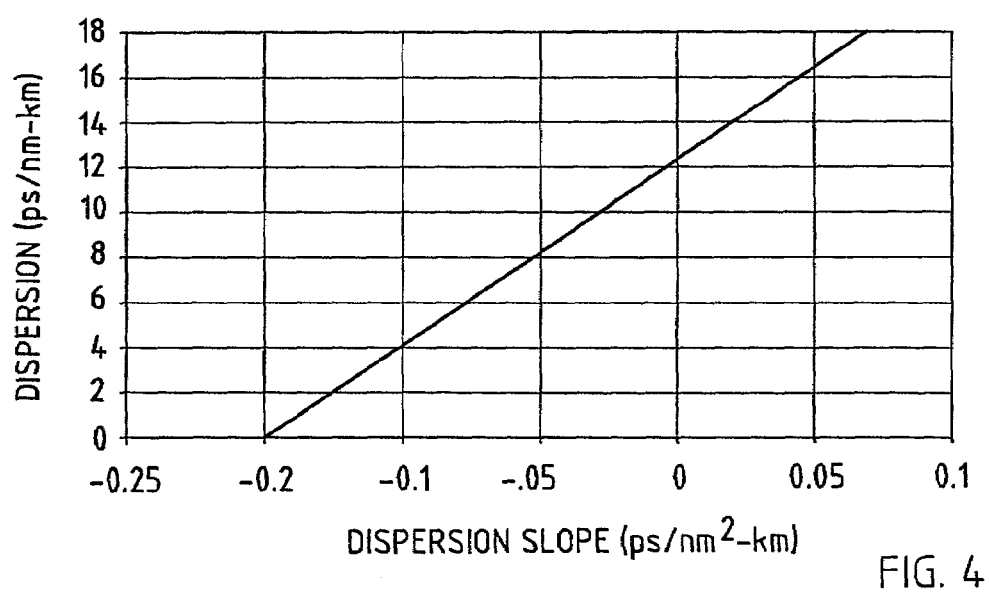
FIG. 4 is a graph of dispersion vs. dispersion slope for a κ compensating fiber.

In addition, a refractive index profile of the SMF-28™ fiber is illustrated in FIG. 3. Introducing the relevant dispersion and dispersion slope values for LEAF® and SMF-28™ fibers into equation 1 and assuming a 100 km span of transmission fiber 12 and that kappa compensating fiber 14 is less than or equal to about 10 km in length, a κ enhancement factor ($\kappa_{SC}/\kappa_T$) of 1.332 is calculated. Using 1.332 as a reference point, equation 1 (pg. 7) can be rewritten into equation 2, thereby relating dispersion and dispersion slope of other κ compensating fibers. This equation, $1.665\, S_{FC} + 0.332 = 0.025\, D_{FC}$, is plotted in FIG. 4. We have discovered that it is difficult to achieve dispersion and dispersion slope values that are above the line shown in FIG. 4 without sacrificing bend sensitivity, manufacturing ease and fiber performance reliability.

The dispersion compensating fiber 16 may be, for example, a fiber selected from those disclosed within U.S. patent application Ser. No. 09/802,696, filed Mar. 9, 2001, entitled Dispersion Compensating Optical Fiber, which claims the benefit of priority of U.S. Provisional Application Nos. 60/192,056, filed Mar. 24, 2000 and 60/196,437, filed Apr. 12, 2000, and which is incorporated herein by reference in its entirety.

Figure 5:
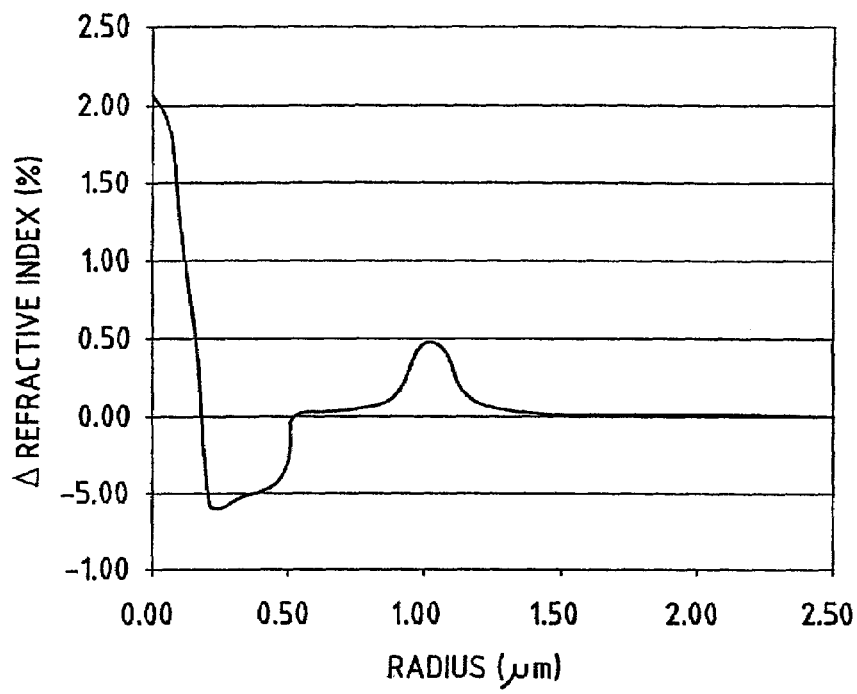
FIG. 5 is a diagram of a refractive index profile for a dispersion compensating fiber.

The optical properties of a particularly preferred one of these fibers are set forth in Table 4. This fiber exhibits a refractive index profile similar to that shown in FIG. 5, with $\Delta_1=1.8\%$, $r_1=1.8$ µm, $\Delta_2=-0.69\%$, $r_2=5$ µm, and the peak height of the annular ring $\Delta_3=0.7\%$, with a central peak radius of 7.5 µm, and a half height width of 0.9 µm.

TABLE 4

OPTICAL PROPERTIES FOR THE DISPERSION COMPENSATING FIBER

| | |
|---|---|
| Dispersion at 1550 nm | −120 ps/nm-km |
| Dispersion Slope at 1550 nm | −1.6 ps/nm²-km |
| κ at 1550 nm | 75 nm |

In the illustrated example, the LEAF® fiber, as transmission fiber 12, is optically coupled to the SMF-28™ fiber as the kappa compensating fiber 14, which is in turn optically coupled with dispersion compensating fiber 16 as described above. In the present example, the LEAF® fiber has a κ value of about 50 nm, while the SMF-28™ fiber has a κ value of about 300 nm. When the appropriate respective length of each fiber is employed, the κ value of the LEAF® fiber coupled with the κ value of the SMF-28™ fiber, can result in an effective combined κ value of approximately 75 nm. Other relative lengths and corresponding κ values are discussed below. This resultant κ value is then coupled with the κ value of dispersion compensating fiber 16 having a magnitude of approximately 75 nm, thereby resulting in the total compensation for dispersion and dispersion slope within transmission line 10. Preferably, the dispersion properties of fibers 12, 14 and 16 are selected so that the total dispersion for transmission line 10 is within the range of about 2.0 ps/nm-km≧total dispersion≧about −2.0 ps/nm-km at 1550, and more preferably over a range of wavelengths surrounding 1550 nm, for example over the wavelength range between 1530 and 1620 nm, while the total dispersion slope is within the range of about 0.02 ps/nm$^2$-km≧total dispersion slope≧about −0.02 ps/nm$^2$-km. More preferably, the dispersion properties of fibers 12, 14 and 16 are selected so that the total dispersion for transmission line 10 is within the range of about 1.0 ps/nm-km≧total dispersion≧about −1.0 ps/nm-km at 1550, and more preferably over a range of wavelengths surrounding 1550 nm, for example over the wavelength range between 1530 and 1620 nm. More preferably, the dispersion properties of fibers 12, 14 and 16 are selected so that the total dispersion for transmission line 10 is within the range of about 0.1 ps/nm-km≧total dispersion≧about −0.1 ps/nm-km at 1550 nm, while the total dispersion slope is more preferably within the range of about 0.015 ps/nm$^2$-km≧total dispersion slope≧−0.015 ps/nm$^2$-km. Most preferably, the dispersion properties of fibers 12, 14 and 16 are selected so that the total dispersion for transmission line 10 is about 0 ps/nm-km, while the total dispersion slope is about 0 ps/nm$^2$-km.

It should be noted that while the preferred embodiment for transmission line 10 utilizes a LEAF® fiber having a κ of about 50 nm, an SMF-28™ fiber having a κ of about 300 nm and a dispersion compensating fiber 16 having a κ value of about 75 nm, other fibers displaying other properties as required in the accompanying claims may be utilized. Generally, it is preferred that the particular fiber utilized as kappa compensating fiber 14 have a κ value as large in magnitude as possible and the dispersion of kappa compensating fiber is positive. Preferably, kappa compensating fiber 14 should have a κ value of equal to or greater than 100 nm, and more preferably greater than 200 nm. Most preferably, kappa compensating fiber 14 should have a κ value of equal to or greater than 300 nm.

It should also be noted that as the κ values for transmission fiber 12, kappa compensating fiber 14 and dispersion compensating fiber 16 change, the respective lengths are also altered to maximize dispersion and dispersion slope compensation. Several κ values for the dispersion compensating fiber 16 and the corresponding length of the transmission fiber 12, kappa compensating fiber 14, and dispersion compensating fiber 16 are listed below in Table 5.

TABLE 5

| κ of dispersion compensating fiber (nm) | 60 | 70 | 75 | 80 | 85 |
|---|---|---|---|---|---|
| Length of dispersion compensating fiber (km) | 4.394 | 6.272 | 4.517 | 5.071 | 4.604 |
| Length of SMF-28 ™ fiber (km) | 11.868 | 16.741 | 18.598 | 20.913 | 24.445 |
| Length of LEAF ™ fiber (km) | 75 | 75 | 75 | 75 | 75 |

In the present example, the three fibers form a continuous fiber span length, wherein the length of the LEAF® fiber is preferably between 72% and 83% of the total length of continuous fiber span of the transmission line 10, the length of the SMF-28™ fiber is preferably between 13% and 24% of the total length of the continuous fiber span, and the length of the dispersion compensating fiber is between 4% and 7% of the total length of continuous fiber span. More preferably, the length of LEAF® fiber is about 76% of the total length of the transmission line 10, the length of the SMF-28™ fiber is about 19.0% of the total length of the transmission line 10, and the length of the dispersion compensating fiber is about 4.6% of the total length of transmission line 10.

Figure 6:
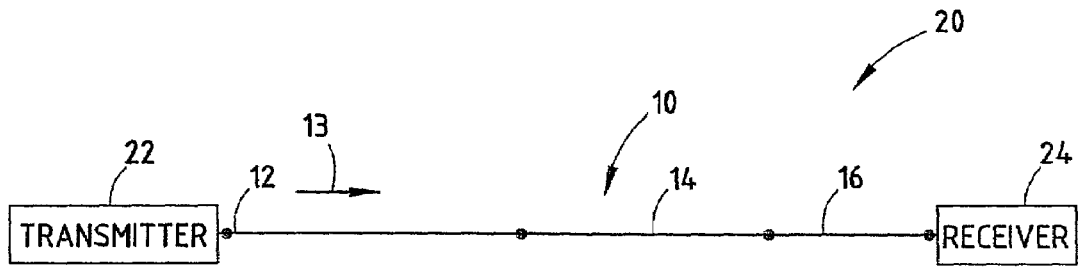
FIG. 6 is a schematic view of a fiber optic communications system employing the optical signal transmission line.

As shown in FIG. 6, the optical signal transmission line 10 is constructed and configured in accordance with the present invention and used in an optical communication system 20. System 20 includes an optical signal transmitter 22 and an optical signal receiver 24 wherein transmitter 22 transmits optical signal 13 to receiver 24 via transmission line 10. System 20 preferably also includes wavelength division multiplexing (WDM) technology and is capable of transmitting at more than at least 3 channels located at separate wavelengths with the range between 1530 and 1620 nm.

Figure 7:
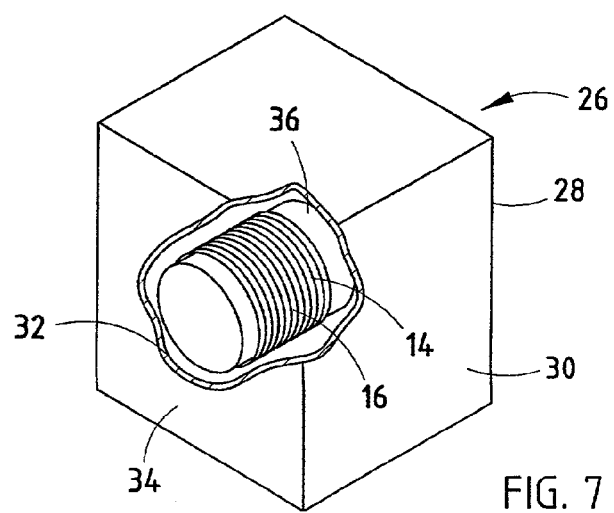
FIG. 7 is a perspective view of a dispersion compensating module, cut-away to show an interior thereof.
Figure 8:
FIG. 8 is a schematic view of a fiber optic communications system employing the module.

As shown in FIG. 7, kappa compensating fiber 14 and dispersion compensating fiber 16 are preferably constructed and configured in accordance with the present invention and utilized within a dispersion compensating module 26. Module 26 includes a housing 28 having a plurality of sidewalls 30 forming a rectangularly shaped box, a rear wall 32 and a front wall 34. Module 26 also includes a centrally located cylindrical hub 36 extending forwardly from rear wall 32. Module 26 further includes kappa compensating fiber 14 and/or dispersion compensating fiber 16 housed within housing 28 and coiled about hub 36, and is adapted for easy insertion into and coupling with an optical transmission system and compensate for the κ values associated therewith. FIG. 8 illustrates module 26 used within optical communication system 20.

It is become apparent to those skilled in the art that various modifications to the preferred embodiment of the invention as described herein can be made without departing from the spirit or scope of the invention as defined by the appended claims.

The invention claimed is:

1. An optical signal transmission line, comprising:
a first fiber having positive dispersion and positive dispersion slope and having a first κ at 1550 nm;
a second fiber optically coupled to said first fiber, said second fiber capable of guiding the optical signal therethrough and having a second κ fiber at 1550 nm; and
a third optical fiber having a kappa intermediate said first and second fibers, said third fiber having negative dispersion at 1550 nm and being capable of guiding the optical signal therethrough wherein the κ of the first fiber is less than 75, the κ of the second fiber is greater than 100,and the κ of the third fiber is less than 100.

2. The optical signal transmission line of claim 1, wherein the κ of the second fiber is greater than 200.

3. The optical signal transmission line of claim 1, wherein the κ of the second fiber is greater than 250.

4. The transmission line of claim 1, wherein the dispersion and kappas of the first, second and third fibers cooperate such that the total dispersion of the transmission line is within the range of about 2.0 ps/km-nm≧total dispersion≧about −2.0 ps/km-nm at a wavelength of 1550 nm, and the total dispersion slope of the transmission line within the range of about 0.02 ps/nm²-km ≧ total dispersion slope ≧ about −0.02 ps/nm²-km at a wavelength of 1550 nm.

5. The optical signal transmission line of claim 1, wherein the first fiber has an effective area of greater than or equal to about 50 µm².

6. The optical signal transmission line of claim 5, wherein the first fiber has an effective area of greater than or equal to about 60 µm².

7. The optical signal transmission line of claim 6, wherein the first fiber has an effective area of greater than or equal to about 65 µm².

8. The optical signal transmission line of claim 1, wherein the second fiber has a positive dispersion at 1550 nm.

9. An optical signal transmission system which comprises a transmission line in accordance with claim 1, wherein the transmission line defines a continuous fiber span total length, and wherein the first fiber has a length of within the range of between about 72% and about 82% of the total length of said continuous fiber span.

10. The optical signal transmission system of claim 9, wherein the second fiber has a length of within the range of between about 13% and about 24% of the total length of said continuous fiber span.

11. The optical signal transmission system of claim 10, wherein the κ compensating fiber has a length of within the range of between about 4% and about 7% of the total length of said continuous fiber span.

12. The optical signal transmission line of claim 1, wherein the second compensating fiber has a positive dispersion.

13. The optical signal transmission line of claim 1, wherein the total dispersion is within the range of about 1 ps/nm-km ≧ total dispersion ≧ about −1 ps/nm-km over the wavelength range from about 1530 to 1620 nm.

14. The optical transmission line of claim 1, wherein the total dispersion slope is within the range of about 0.015 ps/nm²-km ≧ total dispersion slope ≧ about 0.015 ps/nm²-km at 1550 nm.

15. An optical signal transmission system, comprising:
a transmitter that transmits the optical signal;
the transmission line of claim 1 in optical communication with the transmitter and that receives the optical signal therefrom; and
a receiver in optical communication with the transmission line and that receives the optical signal therefrom.

16. A dispersion compensating module, for compensating dispersion and dispersion slope of a transmission fiber adjusted to guide an optical signal therethrough and having a κ value, the dispersion compensating module comprising a coiled length of:
a first compensating fiber adapted to guide the optical signal therethrough and having a κ of less than or equal to about 100 nm at a wavelength of 1550 nm; and
a second compensating fiber adapted to guide the optical signal therethrough and having a κ of greater than or equal to about 60 nm at a wavelength of 1550 nm.

17. An optical signal transmission line comprising the dispersion compensating module of claim 16, further comprising a transmission fiber having a κ greater than or equal to about 300 nm at a wavelength of 1550 nm.

18. The dispersion compensating module of claim 16, wherein the κ of the second compensating fiber is greater than about 75 nm at a wavelength of 1550 nm.

19. The dispersion compensating module of claim 16, wherein the κ of the first compensating fiber is greater than about 200 nm at a wavelength of 1550 nm.

20. The dispersion compensating module of claim 16, wherein the first compensating fiber has a positive dispersion at 1550 nm.

21. The dispersion compensating module of claim 20, wherein the second compensating fiber has a negative dispersion at 1550 nm.

22. An optical signal transmission line, comprising:
a first fiber having positive dispersion and positive dispersion slope and having a first κ at 1550 nm;
a second fiber optically coupled to said first fiber, said second fiber capable of guiding the optical signal therethrough and having a second κ greater than the κ of said first fiber at 1550 nm; and
a third optical fiber having a kappa intermediate said first and second fibers, said third fiber having negative dispersion at 1550 nm and being capable of guiding the optical signal therethrough, wherein the κ of the first fiber is less than 75, the κ of the second fiber is greater than 100, and the κ of the third fiber is less than 100.

23. An optical signal transmission line, comprising:
a first fiber having positive dispersion and positive dispersion slope and having a first κ at 1550 nm;
a second fiber optically coupled to said first fiber, said second fiber capable of guiding the optical signal therethrough and having a second κ at 1550 nm; and
a third optical fiber having a kappa intermediate said first and second fibers, said third fiber having negative dispersion at 1550 nm and being capable of guiding the optical signal therethrough, wherein the transmission line defines a continuous fiber span total length, and wherein the first fiber has a length of within the range of between about 72% and about 82% of the total length of said continuous fiber span.

* * * * *